US012154406B2

(12) United States Patent
Deaton et al.

(10) Patent No.: US 12,154,406 B2
(45) Date of Patent: Nov. 26, 2024

(54) ASSEMBLY FOR PRODUCT SUPPORT AND DEPLOYMENT FOR A VENDING MACHINE

(71) Applicant: Automated Retail Technologies, LLC, Sarasota, FL (US)

(72) Inventors: James Edward Deaton, Georgetown, TX (US); Linda H. Wu, Newberg, OR (US); John C. Serieka, Chicago, IL (US); Lynn Warren Hamrick, Leander, TX (US); Sean Raymond Lucas, Leander, TX (US); William Warrenburg, Austin, TX (US); Brent Joseph Clafferty, Round Rock, TX (US)

(73) Assignee: Automated Retail Technologies. LLC, Sarasota, FL (US)

( * ) Notice: Subject to any disclaimer, the term of this patent is extended or adjusted under 35 U.S.C. 154(b) by 329 days.

(21) Appl. No.: 16/965,651

(22) PCT Filed: Jan. 28, 2019

(86) PCT No.: PCT/US2019/015341
§ 371 (c)(1),
(2) Date: Jul. 29, 2020

(87) PCT Pub. No.: WO2019/152297
PCT Pub. Date: Aug. 8, 2019

(65) Prior Publication Data

US 2021/0043024 A1 Feb. 11, 2021

Related U.S. Application Data

(60) Provisional application No. 62/625,439, filed on Feb. 2, 2018.

(51) Int. Cl.
*G07F 11/16* (2006.01)
*G07F 11/14* (2006.01)

(52) U.S. Cl.
CPC .............. *G07F 11/16* (2013.01); *G07F 11/14* (2013.01)

(58) Field of Classification Search
CPC ........ G07F 11/005; G07F 11/04; G07F 11/12; G07F 11/14; G07F 11/16; G07F 11/50; G07F 11/54; G07F 11/56
See application file for complete search history.

(56) References Cited

U.S. PATENT DOCUMENTS 2,182,255 A * 12/1939 Ford .......................... A47F 1/10 221/281
2,394,262 A 2/1946 Reifsnyder
(Continued)

FOREIGN PATENT DOCUMENTS

EP 1063620 12/2000
KR 0129542 3/1999
(Continued)

OTHER PUBLICATIONS

International Search Report filed in PCT/US2019/015341 dated Apr. 19, 2019.

*Primary Examiner* — Gene O Crawford
*Assistant Examiner* — Kelvin L Randall, Jr.
(74) *Attorney, Agent, or Firm* — Shumaker, Loop & Kendrick, LLP

(57) ABSTRACT

An assembly for product support and deployment for a vending machine includes a product chute, a pusher, a pusher drive assembly, and a controller. The product chute is configured to receive a plurality of products stacked on one another. The product chute includes an exit opening through which a respective product of the plurality of products is dispensed. The pusher drive assembly is operatively connected with the pusher and is configured so as to move the pusher in at least two mutually perpendicular axes. The controller is in communication with the pusher drive
(Continued)

assembly. The controller is configured to control operation of the pusher drive assembly such that the pusher pushes the respective product being dispensed towards the exit opening and supports or lifts the remaining products in the chute against the force of gravity prior to the respective product fully exiting the product chute through the exit opening.

14 Claims, 8 Drawing Sheets

(56) References Cited

U.S. PATENT DOCUMENTS

| | | | | | |
|---|---|---|---|---|---|
| 2,784,872 | A * | 3/1957 | Lux | G07F 11/38 | 221/241 |
| 3,179,289 | A | 4/1965 | Moyer et al. | | |
| 3,834,582 | A * | 9/1974 | Aspinwall | B65G 59/067 | 221/248 |
| 4,069,943 | A | 1/1978 | Fawcett | | |
| 4,109,825 | A | 8/1978 | Weitzman | | |
| 4,190,420 | A * | 2/1980 | Covington | G01N 35/00029 | 422/561 |
| 4,299,333 | A * | 11/1981 | Welsch | G07F 11/20 | D20/4 |
| 4,305,526 | A * | 12/1981 | Pfleger | B65G 59/067 | 221/256 |
| 4,831,810 | A * | 5/1989 | Engel | G03D 15/10 | 53/390 |
| 4,869,813 | A * | 9/1989 | Bailey | B23Q 17/24 | 700/223 |
| 4,872,591 | A * | 10/1989 | Konopka | A61J 7/0481 | 221/129 |
| 5,253,782 | A * | 10/1993 | Gates | G07F 11/54 | 221/121 |
| 5,439,136 | A * | 8/1995 | Chatani | G07F 11/22 | 221/270 |
| 5,605,249 | A * | 2/1997 | Gonyea | G07F 11/54 | 221/121 |
| 8,602,715 | B2 | 12/2013 | Schoeppe et al. | | |
| 2002/0000447 | A1* | 1/2002 | Tsuchida | B65H 3/24 | 221/268 |
| 2007/0125794 | A1 | 6/2007 | Jones | | |
| 2014/0183209 | A1 | 7/2014 | Gao et al. | | |
| 2016/0247346 | A1* | 8/2016 | Yamamiya | G07F 11/005 | |

FOREIGN PATENT DOCUMENTS

| | | |
|---|---|---|
| WO | 2008/144824 | 12/2008 |
| WO | 2017/122125 | 7/2017 |

* cited by examiner

ASSEMBLY FOR PRODUCT SUPPORT AND DEPLOYMENT FOR A VENDING MACHINE

BACKGROUND

Vending machines for dispensing pre-packaged products typically include a cabinet or enclosure housing a product storage assembly. The vending machine may or may not be refrigerated and can further include ovens to heat food products. A dispensing mechanism cooperates with the product storage assembly to allow for the dispensing of the products from the vending machine.

Often times these dispensing mechanisms are automated. Challenges can occur when reducing the size of the enclosure or increasing the size of the product storing assembly to maximize the volume of products that can be stored in the vending machine. The present disclosure relates to assemblies for supporting the products and to mechanisms for deployment of the products within the vending machine.

SUMMARY

In view of the foregoing, an assembly for product support and deployment for a vending machine includes a product chute, a pusher, a pusher drive assembly, and a controller. The product chute is configured to receive a plurality of products stacked on one another. The product chute includes an exit opening through which a respective product of the plurality of products is dispensed. The pusher includes a pushing surface and a support surface. The pushing surface is configured to push the respective product being dispensed towards the exit opening. The support surface is configured to support remaining products of the plurality of products that remain in the chute. The pusher drive assembly is operatively connected with the pusher and is configured so as to move the pusher in at least two mutually perpendicular axes. The controller is in communication with the pusher drive assembly. The controller is configured to control operation of the pusher drive assembly such that the pusher pushes the respective product being dispensed towards the exit opening and supports or lifts the remaining products in the chute against the force of gravity prior to the respective product fully exiting the product chute through the exit opening.

DETAILED DESCRIPTION

Figure 1:
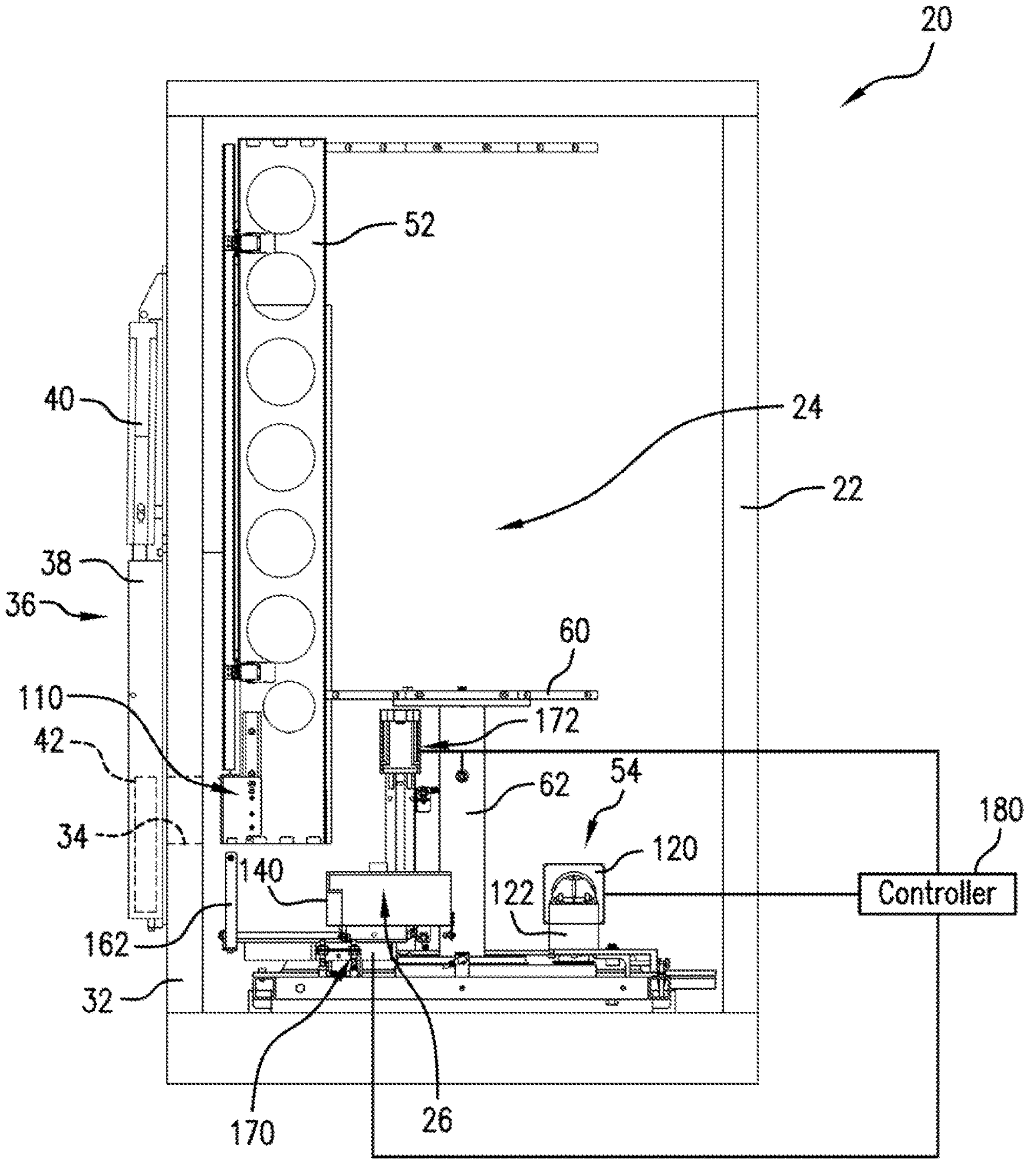
FIGS. 1-4 are side schematic views of a portion of a vending machine including an enclosure, a product storage assembly and a dispensing mechanism with the product storage assembly and the dispensing mechanism in different operating positions.

The description and drawings herein are merely illustrative and various modifications and changes can be made in the structures disclosed without departing from the present disclosure. The term "vending machine" is used to denote any type of machine that stores products for remote distribution or sales to consumers in which the consumer transacts business with the machine. FIGS. 1-4 schematically depict a vending machine 20 including a cabinet or enclosure 22 for housing various operational components of the vending machine 20. The vending machine 20 also includes a product storage assembly, which can be in the form of a carrousel 24, positioned within the enclosure 22 and a dispensing mechanism, which can include a pusher 26 that cooperates with the product storage carrousel 24 to dispense a respective product 28*a* (FIG. 4) among a plurality of products 28 from the enclosure 22 and eventually from the vending machine 20. The pusher 26 is configured to push the respective product 28*a* being dispensed and to also support remaining products of the plurality of products 28 that remain above the respective product 28*a* while it is being dispensed.

FIGS. 1-4 depict movements of the pusher 26 and other components within the vending machine 20 during a dispensing operation, and will be described in more detail below.

The enclosure 22 includes a plurality of sidewalls (not all of which are shown) in which at least one side wall 32 includes an enclosure exit opening 34 (shown in phantom in FIG. 1) through which the respective product 28*a* being dispensed exits the enclosure 22. The vending machine 20 further includes an enclosure door assembly 36 which includes an enclosure door frame 38, an enclosure door drive 40, and an enclosure door 42. The enclosure door frame 38 connects with and is fixed to the side wall 32 having the enclosure exit opening 34. The enclosure door drive 40 is operatively connected with the enclosure door 42. The enclosure door 42 is moveable between a closed position (shown in FIG. 1) where the enclosure door 42 covers the enclosure exit opening 34 and an open position (shown in FIG. 4) where the enclosure door 42 is moved away from the enclosure exit opening 34 such that the enclosure exit opening 34 is open. The enclosure door drive 40 moves the enclosure door 42 between the open position and the closed position.

Figure 5:
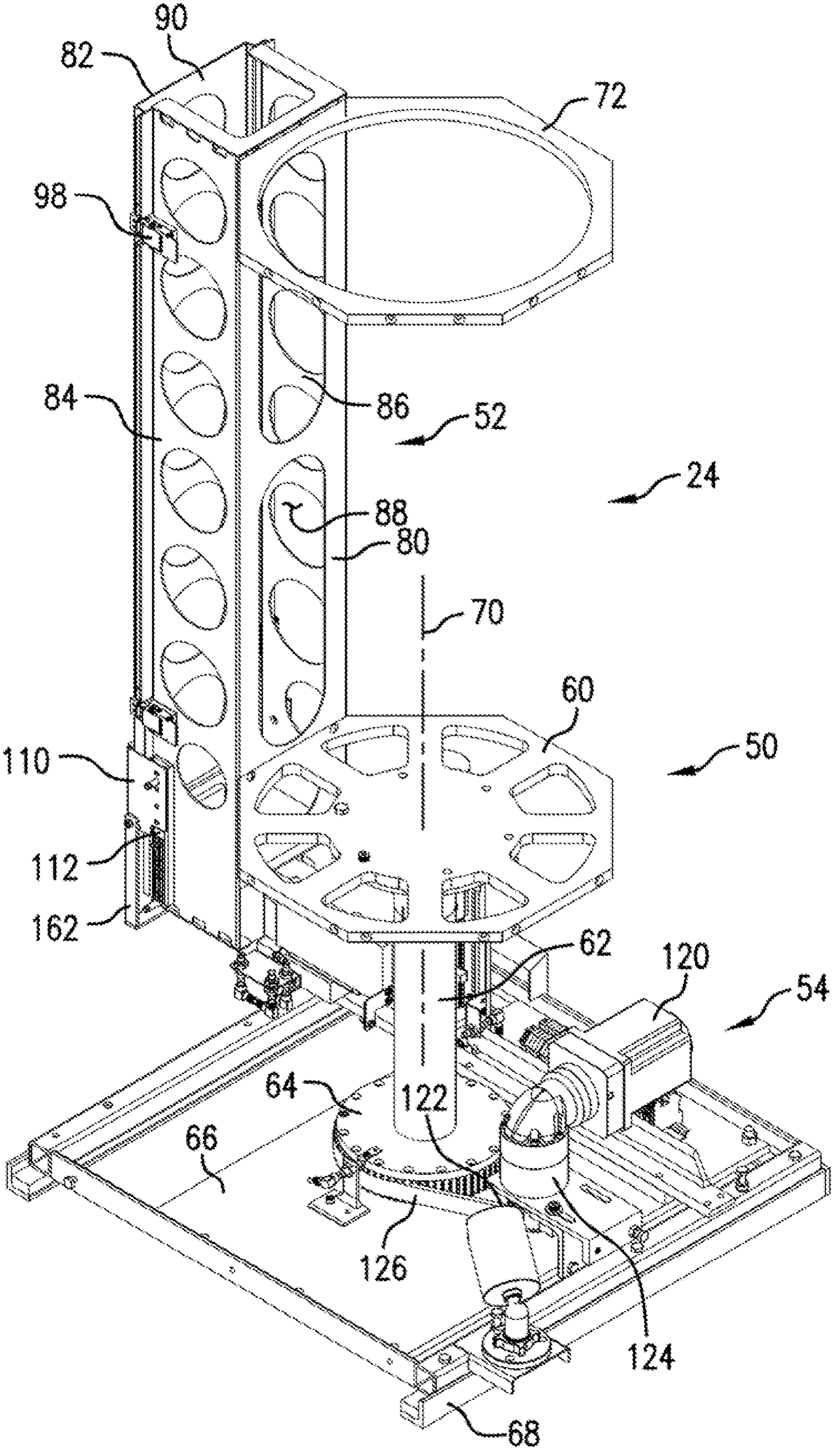
FIG. 5 is a perspective view of the product storage assembly and the dispensing mechanism.

With reference to FIG. 5, the product storage carrousel 24 includes a turret 50, product chutes 52 (only one shown in FIG. 5) connected with the turret 50 and a carrousel drive 54. The turret 50 includes a table 60 connected with a post 62 mounted to a base wheel 64. The base wheel 64 is rotatably mounted on a plate 66, which is attached to a frame 68 such that the base wheel 64 rotates with respect to the plate 66 about a vertical rotational axis 70.

Figure 6:
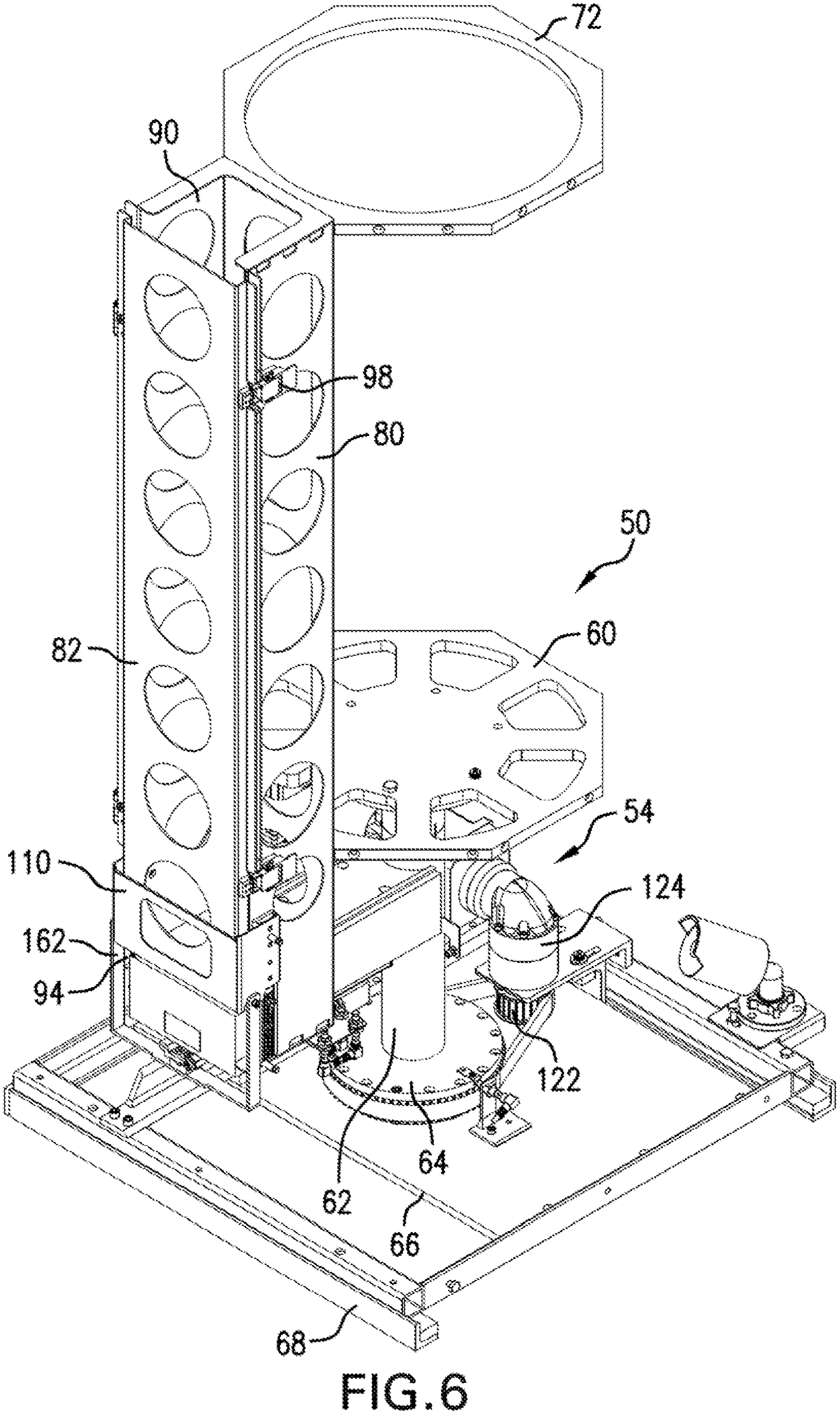
FIG. 6 is another perspective view of the product storage assembly and the dispensing mechanism.

The product chutes 52 connect with the table 60 and also with an upper frame member 72. When viewed normal to the vertical rotational axis 70, the table 60 and the upper frame member 72 are octagonal in configuration, which allows for eight product chutes 52 to be connected with the table 60 and the upper frame member 72; however, only one product chute 52 is shown in FIGS. 5 and 6 for clarity purposes.

Figure 7:
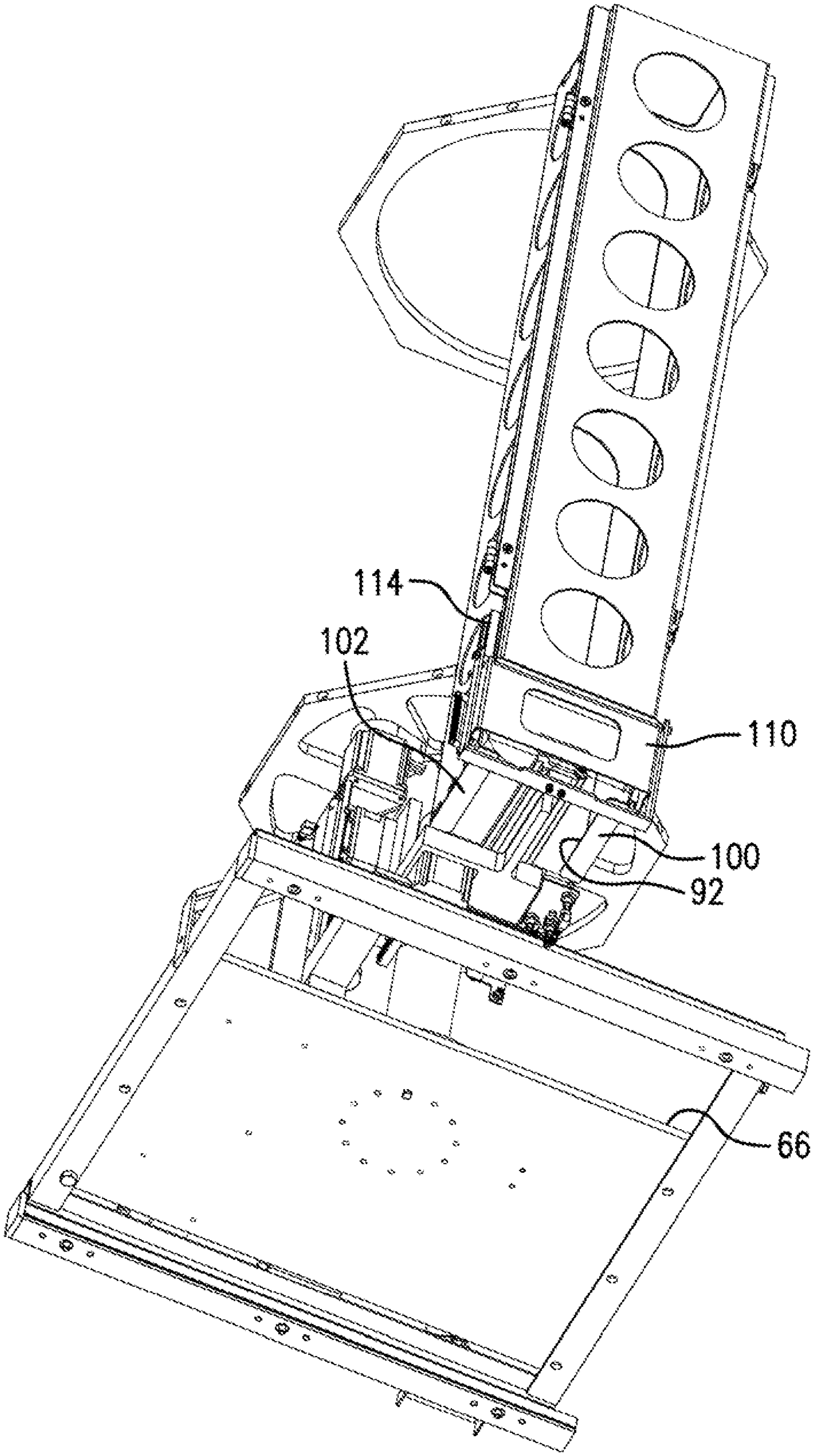
FIG. 7 is another perspective view of the product storage assembly and the dispensing mechanism.

The product chute 52 includes an inner wall 80 that faces towards and contacts the table 60 and the upper frame member 72 and an outer wall 82 spaced from the inner wall 80 in a radial direction from the vertical rotational axis 70. The product chute 52 also includes two lateral walls: a first lateral wall 84 and a second lateral wall 86. The inner wall 80 connects with the outer wall 82 through the lateral walls 84, 86 to define a cavity 88 in which the plurality of products 28 are vertically stacked one on top of another. The product chute 52 also includes an upper opening 90 and a lower opening 92 (FIG. 7). The outer wall 82 includes an exit opening 94 and the lower opening 92 is beneath the exit opening 94. The inner wall 80 includes a pusher entrance opening 96 aligned radially with respect to the vertical rotational axis 70 with the exit opening 94. The outer wall 82 is removable from the lateral walls 84, 86 and latch mechanisms 98 are provided to selectively connect the outer wall 82 with the lateral walls 84, 86. Lower supports 100, 102 are provided to prevent the plurality of products 28 stored within each product chute 52 from falling through the lower opening 92. In the illustrated embodiment, the lower supports 100, 102 are flanges provided at a lower end of each respective lateral wall 84, 86.

The plurality of products 28 are vertically stacked one on top each another, and in the illustrated embodiment there are no horizontal shelves between vertically adjacent products. As such, after the respective product **28*a* (FIG. 4) is dispensed from the product chute 52, the remaining products in the chute fall due to gravity until the lowermost product contact the lower supports 100, 102**.

The product chute 52 also includes a chute lift door 110 that is connected with and moveable with respect to a chute lift door frame including a first doorframe member 112 and a second door frame member 114. The chute lift door 110 is moveable with respect to the door frame members 112, 114 between a raised position (shown in FIG. 3) in which the exit opening 94 is open and a lowered position (shown in FIG. 1) in which the exit opening 94 is closed and covered by the chute lift door 110.

The turret 50 rotates about the vertical rotational axis 70, which results in the product chutes 52 rotating about the vertical rotational axis 70. The carrousel drive 54 drives the turret 50. The carrousel drive 54 includes a motor 120 connected with a drive gear 122 through a transmission (not visible) housed in a transmission housing 124. Actuation of the motor 120 results in rotation of the drive gear 122 which drives a belt 126, which could also be a pinion gear, connected with the base wheel 64. Rotation of the base wheel 64 results in rotation of the table 60 because of the connection through the post 62. The motor 120 drives the turret 50 to align the appropriate product chute 52 with the enclosure exit opening 34 in the side wall 32 to dispense the respective product from the enclosure 22 for further processing by the vending machine 20 or for consumption by a consumer.

When the product chute 52 is aligned with the enclosure exit opening 34 in the side wall 32, the pusher 26 pushes the respective product **28*a* being dispensed towards the enclosure exit opening 34. The pusher 26 is also configured to support remaining products of the plurality of products 28 that remain in the product chute 52 prior to the respective product 28*a* fully exiting the exit opening 94 in the product chute 52**.

Figure 8:
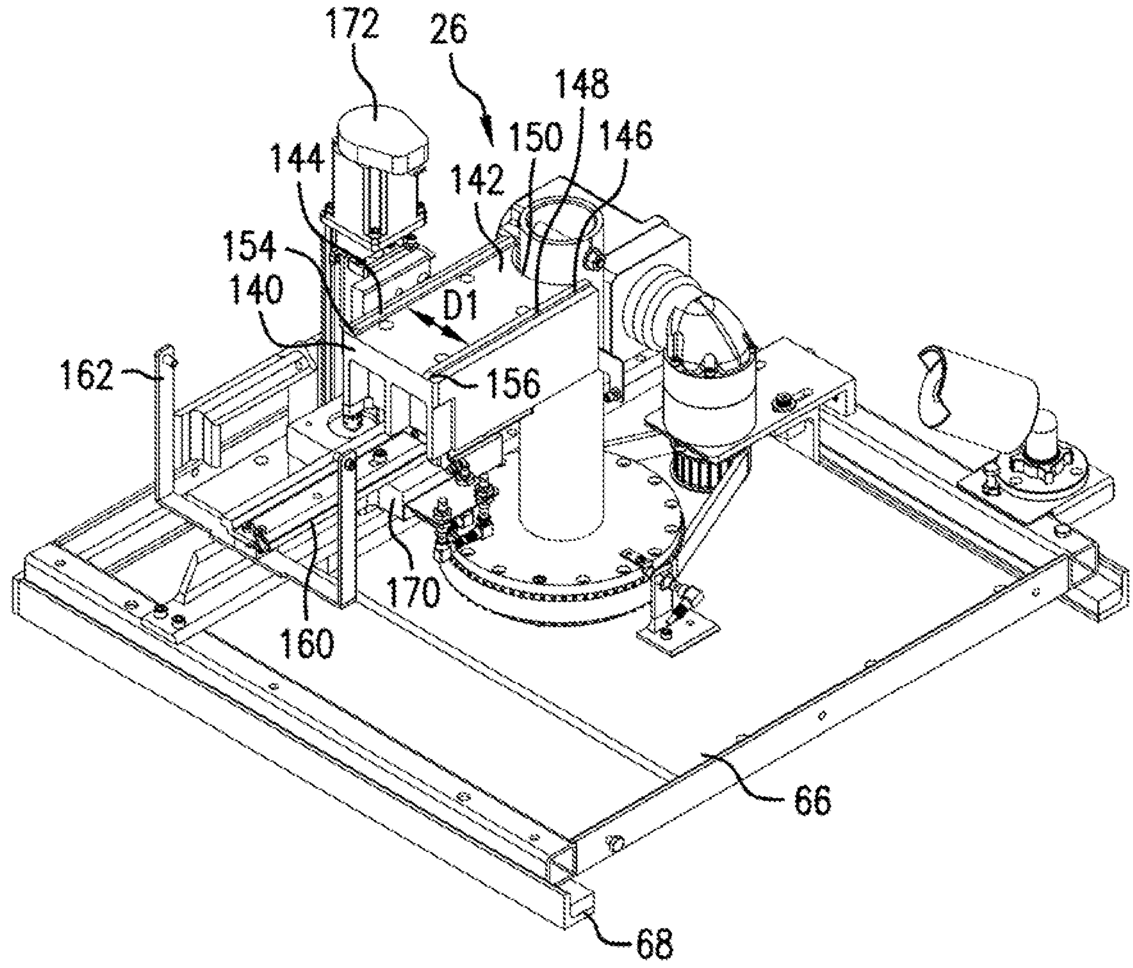
FIG. 8 is a perspective view of the dispensing mechanism.

In the illustrated embodiment and with respect to FIG. 8, the pusher 26 is a generally block-shaped element made from a low friction plastic material; however, the pusher 26 could take other configurations and be made from other materials. The pusher 26 includes a pushing surface 140 configured to push the respective product **28*a* being dispensed towards the exit opening 94 of the product chute 52. In the illustrated embodiment, the pushing surface 140 is generally vertically oriented and normal to a radius emanating from the vertical rotational axis 70. The pusher 26 also includes an upper surface 142 that is perpendicular to the pushing surface 140. The pusher 26 also includes at least one upper rail, a first upper rail 144 and a second upper rail 146 are provided in the illustrated embodiment, extending upwardly from the upper surface 142. The upper rails 144, 146 provide a support surface 148 that is perpendicular to the pushing surface 140. The support surface 148 is configured to support remaining products of the plurality of products 28 that remain in the product chute 52 as the pusher 26 pushes the respective product 28*a* to be dispensed from the product chute 52. The upper rails 144, 146 provide the support surface 148, which is relatively small as compared to the upper surface 142, to reduce the friction between the lower most product adjacently above the respective product 28*a* being dispensed while still providing adequate support for the remaining products in the product chute 52 as the respective product 28*a* is being dispensed. The pusher 26 also includes a rear recess 150 offset from the pushing surface 140 in the direction of travel of the pusher 26 when the pusher 26 is moving and pushing the respective product 28*a* towards the exit opening 94 of the product chute 52**.

The first upper rail 144 is spaced from the second upper rail 146 in a direction perpendicular to the direction in which the pusher 26 travels when the pusher 26 is pushing the respective product **28*a* towards the exit opening 94. As described in more detail below, the pusher 26 travels along a radius emanating from the vertical rotational axis 70. In the illustrated embodiment, the first upper rail 144 is spaced from the second upper rail 146 a distance D1 in the direction perpendicular to the direction in which the pusher 26 travels when pushing. The first lateral wall 84 of the product chute 52 is spaced from the second lateral wall 86 a distance D2 (FIG. 5) measured in the direction perpendicular to the direction in which the pusher 26 travels. D1 is smaller than D2; however, D1 is greater than 80% of D2, which allows the support surface 148 to support the edges of the respective products 28 remaining in the product chute 52**, and where the products are boxes, the edges are typically more structurally sound as compared to center of the box.

Each upper rail 144 and 146 includes a respective beveled forward end surface 154, 156, respectively. Each beveled forward end surface 154, 156 extends forwardly from the support surface 148 to an upper edge of the pushing surface 140. The beveled forward end surfaces 154, 156 can encourage upward movement of the lowermost product adjacently above the respective product **28*a* being dispensed just after the pushing surface 140 contacts the respective product 28*a* being dispensed and begins moving the respective product 28*a* towards the exit opening 94 in the product chute 52**.

The pusher 26 has a maximum height (measured parallel with the vertical rotational axis 70) that is less than the height of the pusher entrance opening 96 provided in the inner wall 80 of the product chute 52. The pusher 26 has a maximum width, measured perpendicular to the height, that is less than the width of the pusher entrance opening 96, which allows the pusher 26 to enter the product chute 52 to dispense the products 28 from the product chute 52.

The pusher 26 mounts on a pusher rail 160 and is slideable along and with respect to the pusher rail 160. A chute lift door opener 162 connects with the pusher rail 160 and is fixed so as not to be moveable with respect to the pusher rail 160.

A pusher drive assembly, which in the illustrated embodiment includes a pusher actuator 170 and a lift actuator 172, is operatively connected with the pusher 26 and configured so as to move the pusher 26 in at least two mutually perpendicular axes, which can be parallel with the vertical rotational axis 70 and perpendicular with the vertical rotational axis 70, e.g. along the radius emanating from the vertical rotational axis 70. The lift actuator 172 is operatively connected with the pusher 26, the pusher rail 160, and the chute lift door opener 162. The pusher actuator 170 is operatively connected with the pusher 26 so as to move the pusher 26 with respect to the pusher rail 160 and the chute lift door opener 162 along the pusher rail 160 in a horizontal direction in the illustrated embodiment.

With reference back to FIG. 1, a controller 180 (schematically depicted only in FIG. 1) is in communication with the pusher drive assembly, which in the illustrated embodiment includes the pusher actuator 170 and the lift actuator 172. The controller 180 can also be in communication with the carrousel drive 54 which includes the motor 120. The controller 180 is configured to control operation of the pusher drive assembly such that the pusher 26 pushes the respective product 28*a* being dispensed towards the exit opening 94 in the product chute 52 and supports or lifts the remaining product 28 in the product chute 52 against the force of gravity prior to the respective product 28*a* fully exiting the product chute 52 through the exit opening 94. The controller 180 controls the operation of the pusher drive assembly, which includes the pusher actuator 170 and the lift actuator 172, and the carrousel drive 54 so as to move the product chute 52, the pusher 26, and the chute lift door opener 162 in the manner described below.

FIG. 1 depicts the pusher 26 in a lowered and retracted position. The chute lift door opener 162 is also in a lowered position. As apparent in FIG. 1, when the pusher 26 is in the retracted position the pushing surface 140 is spaced from the chute lift door opener 162 a distance greater than a maximum dimension of the respective product 28*a*, which is to be dispensed, measured parallel with the direction in which the pusher 26 moves when pushing the respective product 28*a*. With reference to FIGS. 1 and 8, the recess 150 on the pusher 26 at least partially receives the post 62 when the pusher 26 is in the retracted position.

Figure 2:
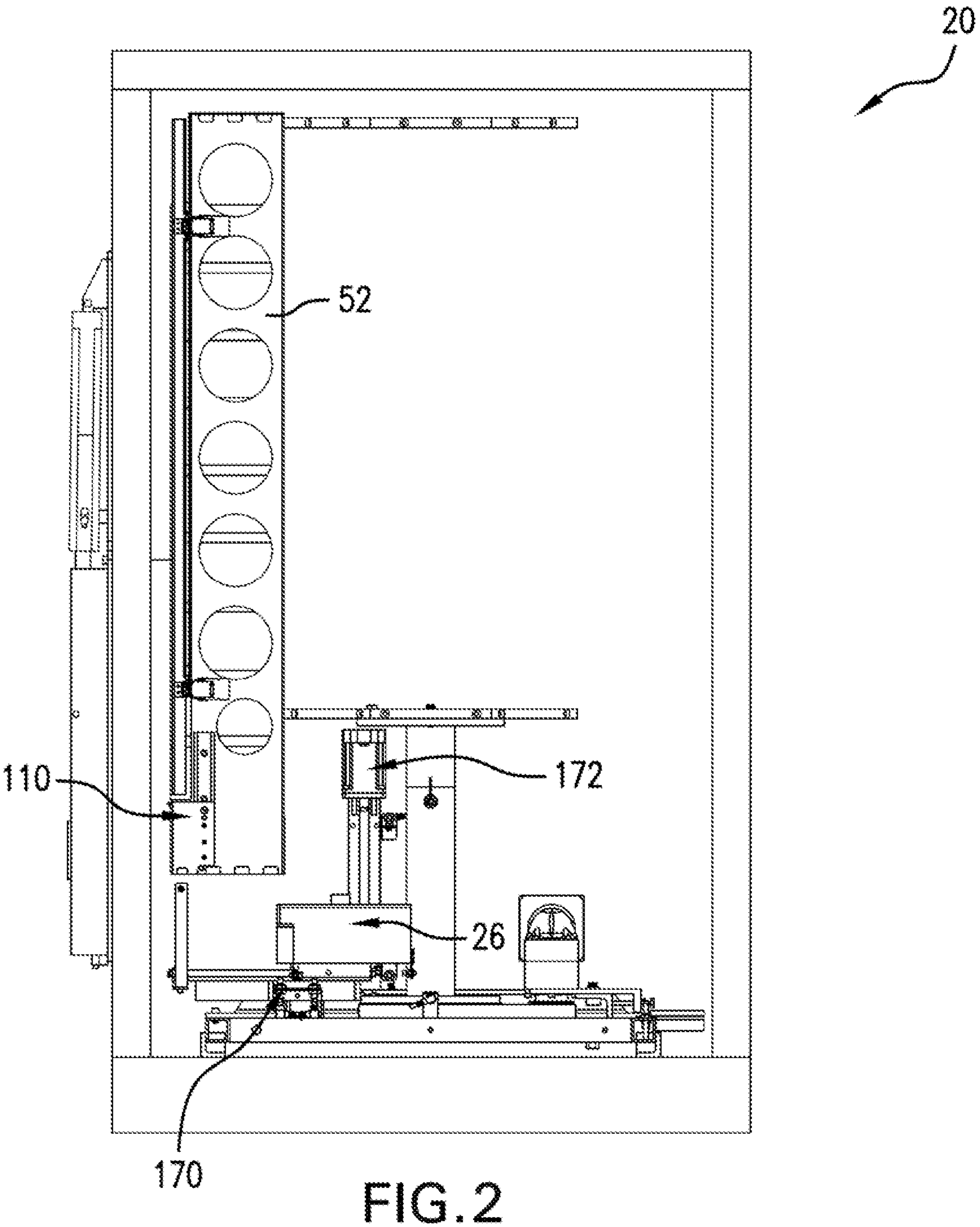
Figure 3:
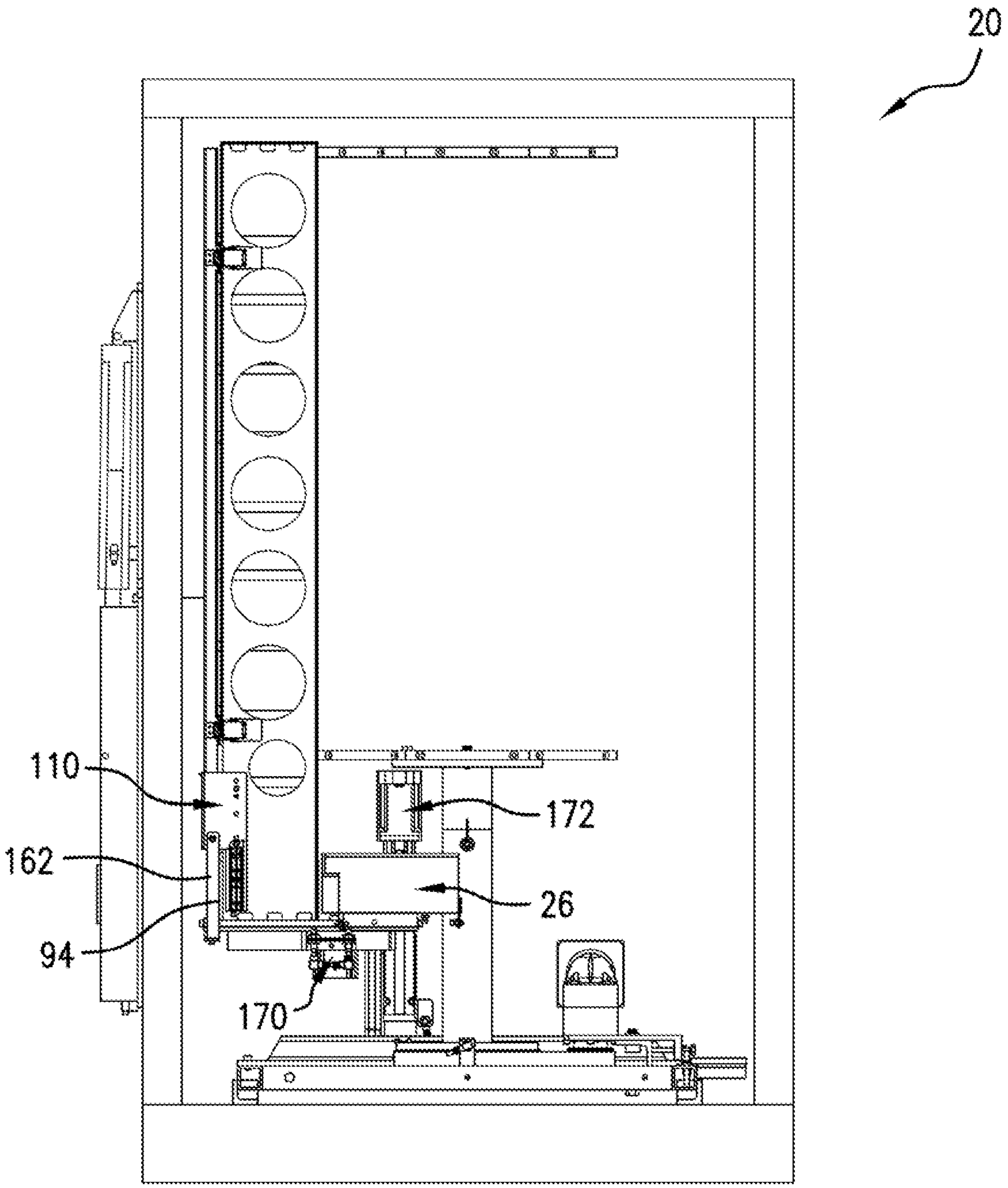

In FIG. 1, the product chute 52 may not be aligned with the enclosure exit opening 34. When the appropriate product chute 52 is not aligned with the enclosure exit opening 34, the controller 180 can communicate with the motor 120 of the carrousel drive 54 to rotate the product chute 52 about the vertical rotational axis 70 so as to align the appropriate product chute 52 with the enclosure exit opening 34, which is shown in FIG. 2. After the appropriate product chute 52 is aligned with the enclosure exit opening 34, the pusher 26 can be raised in an axis parallel with the vertical rotational axis 70 to a raised position, which is shown in FIG. 3. The pusher drive assembly, and more particularly the lift actuator 172, is configured to raise and lower the chute lift door opener 162, which can be seen when comparing FIG. 1 to FIG. 3. The chute lift door 110 is moveable with respect to the product chute 52 such that when the chute lift door opener 162 is in the raised position, the exit opening 94 is open, which can be seen in FIG. 3, and when the chute lift door opener 162 is in a lowered position, which is seen in FIGS. 1 and 2, the exit opening 94 is closed by the chute lift door 110. The chute lift door opener 162 is connected with the pusher 26 such that raising the chute lift door opener 162 results in the pusher 26 being raised, and lowering the chute lift door opener 162 results in the pusher 26 being lowered, and vice versa.

Figure 4:
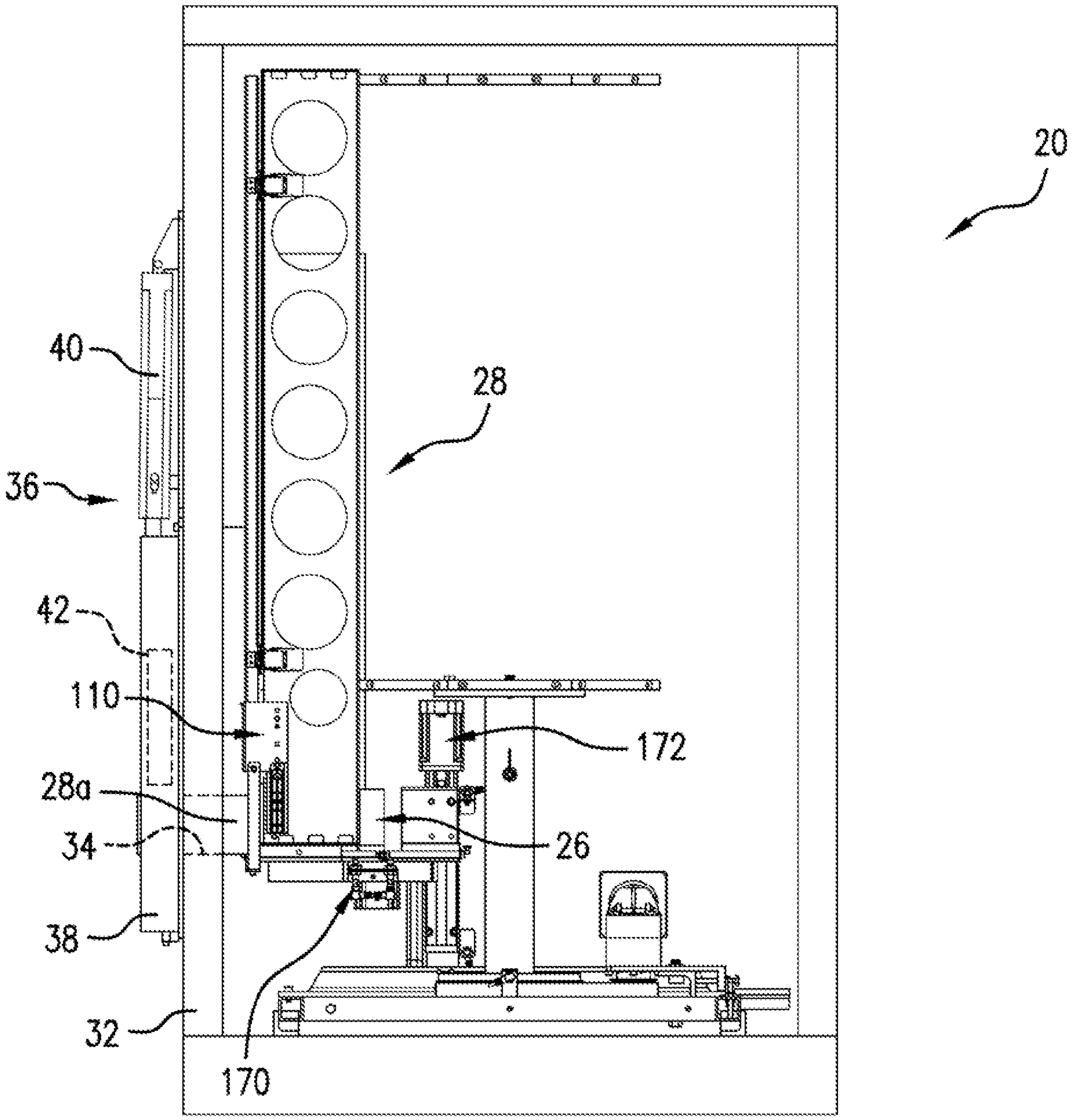

FIG. 4 depicts the pusher 26 in an extended position having pushed the respective product 28*a* through the exit opening 94 in the product chute 52. The chute lift door opener 162 is connected with the pusher 26 and the pusher 26 is moveable with respect to the chute lift door opener 162 in the axis in which the pusher 26 is moving when pushing the respective product 28*a*. The maximum height of the pusher 26, which is measured parallel to the vertical rotational axis 70, is approximately equal to the maximum height of the respective product 28*a* being pushed. This allows the remaining products 28 in the product chute 52 to be supported by the support surface 148 while the pusher 26 is pushing the respective product 28*a* toward the exit opening 94 in the product chute 52.

The controller 180 can be further configured such that the pusher 26 is raised after the pusher 26 has pushed the respective product 28*a* towards, but not entirely through, the exit opening 94, and the pusher 26 then continues to push the respective product 28*a* such that the respective product 28*a* fully exits the product chute 52 through the exit opening 94 after the pusher 26 has been raised. In other words, the pusher 26 can be vertically aligned with the respective product 28*a* to be dispensed and begin pushing the respective product 28*a* toward the exit opening 94 such that only a portion, and not the entirety, of the respective product 28*a* has been pushed through the exit opening 94. The beveled forward end surfaces 154 and 156 on the respective upper rails 144, 146 allow the adjacent product on top of the respective product 28*a* being dispensed to ride along the beveled forward end surfaces 154, 156 and then ride along the support surface 148. When the pusher 26 is somewhere in between the retracted and fully extended positions, e.g., about one half of the way between the retracted and the fully extended positions, the lift actuator 172 can operate to further lift the pusher 26 upward in a vertical direction so as to offset the next lowest product from the top surface of the respective product 28*a* being dispensed to limit the frictional engagement between the upper surface of the respective product 28 being dispensed and the lower surface of the next lowest product.

The pusher 26 returns from the position shown in FIG. 4 to the position shown in FIG. 1. The controller 180 is further configured such that the pusher 26 is lowered through the lower opening 192 in the product chute 52 and then retracted towards the retracted position shown in FIG. 1 after being lowered through the lower opening 192. As such, distance between distal ends of the lower supports 100, 102 is greater than the maximum width of the pusher 26, which allows the pusher 26 to be lowered through the lower opening 92.

A vending machine and an assembly for product support and deployment for a vending machine has been described above with particularity. Modifications and alterations will occur to those upon reading and understanding the preceding detailed description. The invention, however, is not limited to only the embodiments described above. Instead, the invention is broadly defined by the appended claims and the equivalents thereof.

The invention claimed is:

1. An assembly for product support and deployment for a vending machine, the assembly comprising:

a product chute configured to receive a plurality of products stacked on one another, the product chute including an exit opening through which a respective product of the plurality of products is dispensed;

a pusher including a pushing surface configured to push the respective product being dispensed towards the exit opening and a support surface configured to support remaining products of the plurality of products that remain in the chute;

a pusher drive assembly operatively connected with the pusher and configured so as to move the pusher in at least two mutually perpendicular axes;

a controller in communication with the pusher drive assembly, the controller being configured to control operation of the pusher drive assembly such that the pusher pushes the respective product being dispensed towards the exit opening and supports and lifts the remaining products in the chute against the force of gravity prior to the respective product fully exiting the product chute through the exit opening; and a chute lift door connected with the product chute and a chute lift door opener operatively connected with the pusher drive assembly, wherein the pusher drive assembly is configured to raise and lower the chute lift door opener, and the chute lift door is movable with respect to the chute such that when the chute lift door opener is in a raised position, the exit opening is open and when the chute lift door opener is in a lowered position, the exit opening is closed by the chute lift door, wherein the pusher drive assembly includes a lift actuator configured to lift the pusher upward in a vertical direction as the respective product is being dispensed towards the exit opening, the lift actuator further operatively connected with the chute lift door opener to raise and lower the chute lift door opener.

2. An assembly for product support and deployment for a vending machine, the assembly comprising:

a product chute configured to receive a plurality of products stacked on one another, the product chute including an exit opening through which a respective product of the plurality of products is dispensed;

a pusher including a pushing surface configured to push the respective product being dispensed towards the exit opening and a support surface configured to support remaining products of the plurality of products that remain in the chute;

a pusher drive assembly operatively connected with the pusher and configured so as to move the pusher in at least two mutually perpendicular axes; and a controller in communication with the pusher drive assembly, the controller being configured to control operation of the pusher drive assembly such that the pusher pushes the respective product being dispensed towards the exit opening and supports and lifts the remaining products in the chute against the force of gravity prior to the respective product fully exiting the product chute through the exit opening, further comprising a chute lift door connected with the product chute and a chute lift door opener operatively connected with the pusher drive assembly, wherein the pusher includes a rear surface-recess opposite the pushing surface and an upper surface that is perpendicular to the pushing surface, and the upper surface of the pusher includes two upper rails extending from proximate the pushing surface to proximate the rear recess, wherein the support surface comprises respective upper rail surfaces of each of the two upper rails, and the support surface is relatively small as compared to the upper surface to reduce friction between the support surface and a lower most product of the remaining products as the respective product is being dispensed due to the lower most product being suspended above the upper surface by the support surface provided by the two upper rails at least until the respective product fully exits the product chute through the exit opening, wherein the pusher drive assembly is configured to raise and lower the chute lift door opener, and the chute lift door is movable with respect to the chute such that when the chute lift door opener is in a raised position, the exit opening is open and when the chute lift door opener is in a lowered position, the exit opening is closed by the chute lift door, wherein the pusher drive assembly includes a lift actuator configured to lift the pusher upward in a vertical direction as the respective product is being dispensed towards the exit opening, the lift actuator further operatively connected with the chute lift door opener to raise and lower the chute lift door opener.

3. The assembly of claim 2, wherein the product chute includes a lower opening beneath the exit opening, and the pusher is dimensioned so as to be smaller than the lower opening and passable through the lower opening.

4. The assembly of claim 3, wherein the controller is further configured such that the pusher is lowered through the lower opening and then retracted towards a retracted position after being lowered through the lower opening.

5. The assembly of claim 2, wherein the controller is further configured such that the pusher is raised after the pusher has pushed the respective product towards, but not entirely through, the exit opening, and the pusher then continues to push the respective product such that the respective product fully exits the product chute through the exit opening after the pusher has been raised.

6. The assembly of claim 2, wherein the chute lift door opener is connected with the pusher such that raising of the chute lift door opener results in the pusher being raised, and lowering of the chute lift door opener results in the pusher being lowered.

7. The assembly of claim 2, wherein the chute lift door opener is connected with the pusher and the pusher is movable with respect to the chute lift door opener in an axis parallel to a direction in which the pusher is moving when pushing the respective product.

8. The assembly of claim 7, wherein the pushing surface is spaced from chute lift door opener a distance greater than a maximum dimension of the respective product measured parallel with the direction in which the pusher is moving when pushing the respective product when the pusher is an a retracted position.

9. The assembly of claim 2, wherein each of the two upper rails include a respective beveled forward end sloped from the support surface towards the pushing surface that encourage upward movement of the lowermost product as the pusher pushes the respective product being dispensed towards the exit opening.

10. The assembly of claim 9, wherein the respective beveled forward end of each of the two upper rails extends upward and away from an upper edge of the pushing surface in a direction of the rear surface to the support surface such that when the pusher pushes the respective product being dispensed towards the exit opening the respective beveled forward end of each of the two upper rails perform the lifting of the remaining products in the chute.

11. The assembly of claim 2, wherein the pusher includes a first upper rail spaced from a second upper rail in a direction perpendicular to a direction in which the pusher travels when the pusher is pushing the respective product towards the exit opening.

12. The assembly of claim 11, wherein the first upper rail is spaced from the second upper rail a distance D1 in the direction perpendicular to the direction in which the pusher travels when the pusher is pushing the respective product towards the exit opening, wherein the product chute includes a first lateral wall spaced from a second lateral wall a distance D2 in the direction perpendicular to the direction in which the pusher travels when the pusher is pushing the respective product towards the exit opening, wherein D1 is greater than 80% of D2.

13. The assembly of claim 2, further comprising a turret connected with the product chute, wherein the turret includes a post, and the pusher includes a recess which at least partially receives the post when the pusher is in a retracted position.

14. An assembly for product support and deployment for a vending machine, the assembly comprising:

a product chute configured to receive a plurality of products stacked on one another, the product chute including an exit opening through which a respective product of the plurality of products is dispensed;

a pusher including a pushing surface configured to push the respective product being dispensed towards the exit opening and a support surface configured to support remaining products of the plurality of products that remain in the chute;

a pusher drive assembly operatively connected with the pusher and configured so as to move the pusher in at least two mutually perpendicular axes; and a controller in communication with the pusher drive assembly, the controller being configured to control operation of the pusher drive assembly such that the pusher pushes the respective product being dispensed towards the exit opening and supports or lifts the remaining products in the chute against the force of gravity prior to the respective product fully exiting the product chute through the exit opening, wherein the pusher mounts on a pusher rail and is slideable along and with respect to the pusher rail, and a chute lift door opener connects with the pusher rail and is fixed so as not to be moveable with respect to the pusher rail, wherein the pusher drive assembly includes a pusher actuator and a lift actuator, the pusher actuator is operatively connected with the pusher so as to move the pusher with respect to the pusher rail and the chute lift door opener along the pusher rail in a horizontal direction, the lift actuator is operatively connected with the pusher, the pusher rail, and the chute lift door opener, the lift actuator is configured to raise and lower in a vertical direction the pusher rail with the pusher mounted thereto and separately the chute lift door opener.

* * * * *